Aug. 28, 1934.     M. P. WHITNEY     1,971,739
ENGINE STARTER
Filed Jan. 2, 1931

INVENTOR
Maurice P. Whitney
BY Clinton S. Janes
ATTORNEY

Patented Aug. 28, 1934

1,971,739

UNITED STATES PATENT OFFICE 1,971,739

ENGINE STARTER

Maurice P. Whitney, Elmira, N. Y., assignor to Eclipse Machine Company, Elmira, N. Y., a corporation of New York Application January 2, 1931, Serial No. 506,122

8 Claims. (Cl. 74—7)

This invention relates to engine starters and more particularly to an automatic starter gear shift of the type in which a driving member is moved automatically into and out of engagement with a member of the engine to be started.

It is an object of this invention to provide such a device which is efficient and reliable in operation, small in size, and simple and economical to construct.

Another object is to provide such a device in which the drive is self-contained under load, exerting no longitudinal thrusts on the driving shaft.

A further object of the invention is to provide such a device which involves only a slight amount of work to be done on the driving shaft in adapting the same thereto, and which avoids unnecessary weakening of the driving shaft.

Another object is to provide such a device in which certain of the elements thereof serve to house and protect the moving parts of the drive.

Further objects and advantages will be apparent to those skilled in this art from the following description taken in connection with the accompanying drawing in which.

Figure 1:
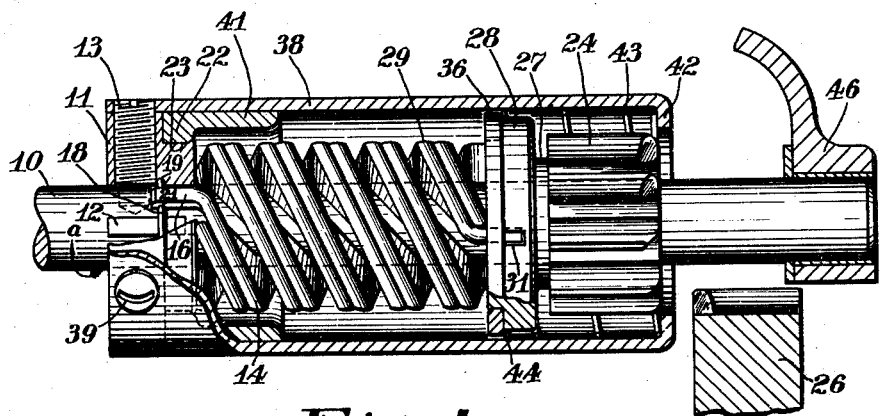
Fig. 1 is a side elevation of a preferred embodiment of the drive, certain parts being broken away and shown in section.

In the embodiment of the invention herein illustrated, a power member in the form of a rotary shaft 10 is provided with an anchor member in the form of a collar 11 fixed thereto in any suitable manner as by means of a key 12 and set screw 13. A plurality of cam members in the form of spiral springs 14 are freely mounted on said shaft with one end of each thereof suitably anchored in said collar. In the form shown, this anchorage is obtained by forming axial extensions 16 on said springs which are adapted to enter corresponding equally spaced slots 17 (Fig. 2) in said collar and to be retained therein by a spring ring 18 which traverses aligned grooves 19 and 21 in the internal surfaces of said collar and springs respectively. The springs are prevented from radial movement out of said slots by means of a thimble 22 mounted on a shoulder 23 of said collar and surrounding the ends of said springs.

A driving member in the form of a pinion 24 is mounted freely on shaft 10 in position to be slid thereon into and out of mesh with a member such as a flywheel gear 26 of an engine to be started. The pinion 24 is provided with an extended hub 27 having an enlarged anchoring portion 28. A plurality of spiral springs 29 of the same number and similar to the springs 14 are anchored at one end in equally spaced slots 31 in the pinion anchorage 28, being retained therein by the spring ring 32 traversing aligned grooves 33 and 34 in the anchorage 28 and springs 29 respectively. A ring 36 is mounted on a shoulder 37 of said anchorage, to surround the ends of springs 29 and prevent radial displacement.

The springs 14 and 29 are preferably formed as illustrated with a rectangular cross section having a large radial dimension with respect to its axial dimension, so that they are comparatively weak as to compression but stiff as to torsion. The free ends of the springs are interthreaded so that relative rotation therebetween causes relative longitudinal movement, and when such longitudinal movement is prevented, a frictional coupling is formed by the wedging together of the interengaging flat surfaces of the springs.

Means for limiting the meshing movement of the pinion 24 is illustrated in the form of a sleeve 38 surrounding the springs and fixed at one end to the collar 11 as by means of the set screw 13 and additional shorter screws 39. The thimble 22 is preferably extended as shown at 41 in order to form a bearing for said sleeve and maintain the same coaxial with the shaft 10.

The sleeve is arranged to loosely surround the ring 36 and anchoring enlargement 28, and is provided at its free end with an inturned flange 42 which is adapted to engage the outer side of the enlargement 28 and thus limit the meshing movement of the pinion 24.

In order to retain the pinion normally in its idle position, an anti-drift means is provided such as the light coiled spring 43 seated at one end against the flange 42 of sleeve 38, and bearing at the other end against the ring 36 which is extended radially beyond the enlargement 28 to form a shoulder 44 to act as the spring abutment.

In case the device is to be arranged as an outboard drive so that the pinion moves away from the motor into mesh with the gear 26, an outboard bearing such as indicated at 46 is preferably provided to steady the shaft 10 and maintain proper mesh between the pinion and gear.

In assembling the device, the springs 29 may first be inserted in the slots 31 of the pinion anchor member 28, the spring ring 32 snapped in position and the retaining ring 36 pressed on the shoulder 37 and retained thereon if desired by slightly upsetting the edge of shoulder 37 as indicated at 35. The springs 14 are then similarly assembled on the collar 11 and retained thereon by spring ring 18 and thimble 22. It will be understood that if desired the retaining ring 36 and thimble 22 may first be placed on the anchoring members 28 and 11 respectively, and the spiral springs 29 and 14 thereafter inserted and locked in place by the spring rings 32 and 18. The pinion assembly and collar assembly are then threaded together, the anti-drift spring 43 placed within the sleeve 38, and said sleeve is then slid over the pinion assembly onto the collar 11 and held thereon by screws 39. Key 12 is then inserted in its keyway in the shaft 10 and the assembled parts are slid on the shaft until the set screw 13 lines up with the corresponding opening in the shaft 10 whereupon the set screw is tightened up on the shaft and the mounting is completed.

Figure 2:
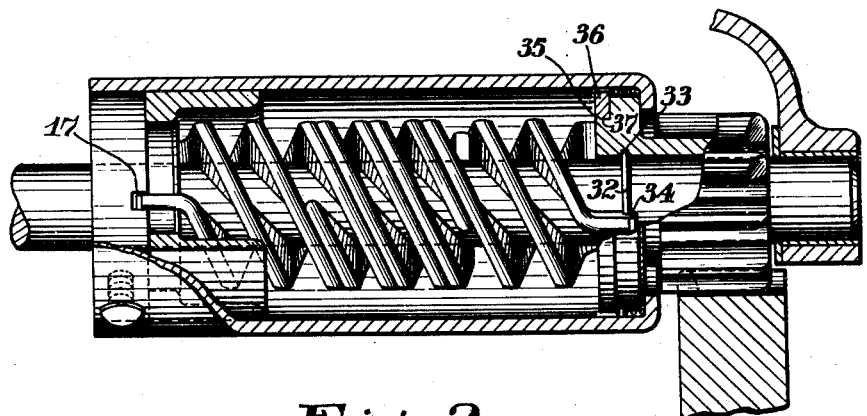
Fig. 2 is a similar view showing the parts in driving position.

In operation, and starting with the parts in the position shown in Fig. 1, rotation of the drive shaft 10 in the direction of the arrow $a$ will cause the pinion 24, by reason of its inertia and the inertia of its associated parts to be threaded to the right into engagement with the engine gear 26, compressing the anti-drift spring 43, until the flange 42 of sleeve 38 engages the side of the anchoring enlargement 28 as shown in Fig. 2. Since further translation of the pinion is thereby prevented, continued rotation of the shaft 10 causes the ends of the springs 14 and 29 to be pressed together until the friction set up between the engaging surfaces of the springs, together with the rotary component of the pressure so set up becomes sufficient to cause the pinion to rotate with the shaft 10 and crank the engine. When the engine becomes self-operative, the acceleration of the engine gear 26 will cause the pinion to overrun the shaft 10 and accordingly thread itself back to idle position where it is maintained by the anti-drift spring 43.

In case the teeth of the pinion should during the meshing operation engage end to end with the teeth of the engine gear, the springs 14 and 29 are designed to be sufficiently yielding in an axial direction to compress slightly and cushion the impact. The friction between the springs then builds up sufficiently to cause indexing of the pinion into proper meshing relation with the engine gear whereupon meshing and driving take place as usual.

It will be noted that by reason of the rigid mounting of the sleeve 38 upon the collar 11 and thimble 22, said sleeve is maintained free from the pinion 24 and does not offer any frictional drag tending to obstruct the translation thereof.

Although but one form of the invention has been shown and described in detail, it will be understood that various changes may be made in the specific details of the structure illustrated and equivalent elements may be substituted for those shown without departing from the spirit of the invention as defined in the claims appended hereto.

What is claimed is:

1. An engine starter drive including a power member, a driving member adapted to be shifted into and out of engagement with a member of the engine to be started, extensible cam means for pushing said driving member into engagement with the engine member, means surrounding said cam means adapted to limit the extension thereof, and means enclosed within said limiting means for normally maintaining said driving member in idle position.

2. An engine starter drive including a power member, a drive member adapted to be shifted into and out of engagement with a member of the engine to be started, yielding cam means for shifting said driving member into engagement with the engine member and thereafter rotating said driving member to crank the engine, and means enclosing said cam means for contacting said driving member and limiting its engaging movement.

3. In an engine starter drive a rotatable shaft, a pinion adapted to be moved into and out of mesh with a member of the engine to be started, a spiral thread anchored at one end to the pinion, a spiral thread anchored at one end to the shaft, said spirals having their free ends inter-threaded whereby relative rotation of the spirals causes the pinion to be moved into and out of mesh with the engine member, and a sleeve surrounding said spirals and adapted to limit the meshing movement of the pinion.

4. In an engine starter drive, a rotatable shaft, a pinion adapted to be moved into and out of mesh with a member of the engine to be started, a spiral spring anchored at one end to the pinion, a spiral spring anchored at one end to the shaft, said spirals having their free ends inter-threaded whereby relative rotation of the spirals causes the pinion to be moved yieldingly into and out of mesh with the engine member, and a sleeve surrounding said spirals, anchored at one end to one spiral and adapted to engage the anchorage of the other spiral to limit the threading action of the spirals in meshing said pinion.

5. In an engine starter drive, a rotatable power member, a driving member, a spiral spring of rectangular cross section anchored at one end to said driving member, a similar spring anchored at one end to said power member, said springs having their free ends in overlapping relation, and a sleeve surrounding said springs and arranged to engage and limit longitudinal movement of the driving member, whereby rotation of the power member will cause longitudinal shifting of the driving member into engagement with said sleeve and will thereafter rotate said driving member through the yielding and frictional connection so formed.

6. In an engine starter drive, a rotatable power member, a driving member, a spiral spring of rectangular cross section anchored at one end to said driving member, a similar spring anchored at one end to said power member, said springs having their free ends in overlapping relation, and a sleeve surrounding said springs and arranged to engage and limit longitudinal movement of the driving member, whereby rotation of the power member will cause longitudinal shifting of the driving member into engagement with said sleeve and will thereafter rotate said driving member through the yielding and frictional connection so formed, and means within said sleeve adapted to engage said driving member and normally maintain it in idle position.

7. An engine starter drive including a power member, a driving member adapted to be shifted into and out of engagement with a member of the engine to be started, yielding cam means anchored to the power member and driving member respectively for shifting said driving member into engagement with the engine member, and means including an element longitudinally fixed to the power member surrounding and enclosing said cam means adapted to limit the camming action thereof.

8. An engine starter drive including a power member, a driving member freely journalled thereon and adapted to be shifted into and out of engagement with a member of the engine to be started, yielding cam means anchored to the power member and driving member respectively for shifting said driving member into engagement with the engine member, and means including an element longitudinally fixed to the power member surrounding and enclosing said cam means adapted to engage the driving member and limit the longitudinal movement thereof.

MAURICE P. WHITNEY.